US006307469B1

(12) United States Patent
Mandry

(10) Patent No.: US 6,307,469 B1
(45) Date of Patent: Oct. 23, 2001

(54) REMOTE DETECTION DEVICE

(76) Inventor: Karl F. Mandry, P.O. Box 4415, Sun River, OR (US) 97707

( * ) Notice: Subject to any disclaimer, the term of this patent is extended or adjusted under 35 U.S.C. 154(b) by 0 days.

(21) Appl. No.: 09/602,364

(22) Filed: Jun. 22, 2000

Related U.S. Application Data

(63) Continuation-in-part of application No. 09/219,233, filed on Dec. 22, 1998, now Pat. No. 6,118,373.

(51) Int. Cl.[7] .............................. G08B 1/00; H04M 1/24

(52) U.S. Cl. .......................... 340/533; 340/501; 340/511; 340/537; 340/594; 340/649; 379/1; 379/102.01; 379/51

(58) Field of Search .................................... 340/533, 531, 340/508, 506, 537, 650, 651, 511, 510, 515, 594, 501, 584, 588, 649; 379/1, 2, 100.05, 102.01, 102.03, 51, 102.02

(56) References Cited

U.S. PATENT DOCUMENTS

| | | | | |
|---|---|---|---|---|
| 3,588,866 | * | 6/1971 | Schlafly, Jr. et al. | 340/533 |
| 3,801,971 | * | 4/1974 | Stendig et al. | 340/533 |
| 3,872,355 | * | 3/1975 | Klein et al. | 340/533 |
| 4,086,434 | * | 4/1978 | Bocchi | 379/102 |
| 4,104,486 | * | 8/1978 | Martin et al. | 379/102 |
| 4,218,677 | * | 8/1980 | Wilson, Jr. et al. | 340/506 |
| 4,241,237 | * | 12/1980 | Parasekvakos et al. | 379/102 |
| 4,348,661 | * | 9/1982 | Lucchesi | 340/510 |
| 4,455,453 | * | 6/1984 | Parasekvakos et al. | 340/825.26 |
| 4,622,541 | * | 11/1986 | Stockdale | 340/566 |
| 4,737,769 | * | 4/1988 | Masot | 340/533 |
| 4,788,714 | * | 11/1988 | Hashimoto | 379/74 |
| 4,845,773 | * | 7/1989 | Attallah | 379/102 |
| 5,008,840 | * | 4/1991 | Depierro | 340/577 |
| 5,119,412 | * | 6/1992 | Attallah | 379/102 |
| 5,293,755 | * | 3/1994 | Thomas | 62/208 |
| 5,822,418 | * | 10/1998 | Yacenda et al. | 379/201 |

* cited by examiner

*Primary Examiner*—Donnie L. Crosland
(74) *Attorney, Agent, or Firm*—Ingrid McTaggart

(57) ABSTRACT

The present invention provides a remote detection device including a conventional measurement device, such as a thermostat, having an internal contact which is wired in series with a resistor and two wires of a standard telephone line. When the measurement device reaches or surpasses a predetermined set value, such as a predetermined temperature, the measurement device will close the internal contact such that the resistor will short the telephone line. Accordingly, when the ambient condition has reached or surpassed the predetermined set value, the owner or manager of a building will receive a busy signal when dialing a telephone line connected to the remote detection device. In another embodiment the remote detection device may comprise a computer program component which periodically monitors the status of a communication line connected to the measurement device at the remote location.

18 Claims, 3 Drawing Sheets

REMOTE DETECTION DEVICE

This application is a continuation-in-part of application Ser. No. 09/219,233, filed on Dec. 22, 1998, now U.S. Pat. 6,118,373 by the same inventor.

TECHNICAL FIELD

The present invention relates to a remote detection device, and more particularly, to a remote detection device for use in remotely determining whether a threshold value of a predetermined parameter, such as temperature, has been reached or surpassed in a detection location, wherein the device does not require power for operation.

BACKGROUND OF THE INVENTION

Measurement devices are well known to measure a predetermined parameter at a measurement location. For example, conventional thermostats typically measure the ambient temperature of a location surrounding the thermostat. Such conventional thermostats often are connected to control devices, such as heaters or coolers, so that when the measured temperature falls below a preset value the heating device will be activated or when the measured temperature rises above a different preset value the cooling device will be activated. Similarly, other measurement devices are known to measure other conditions such as smoke, fire, humidity, light, wind, vibration, noise, water level and the like. These other measurement devices may also be connected to corresponding control devices such as a sprinkler system in the case of smoke and fire detectors, and a water release valve in the case of a water level detector.

In many situations, these measurement and control devices may be located remote from those persons responsible for safekeeping of the building in which the devices are housed. For example, unattended or unoccupied buildings such as warehouses or vacant residential properties may be visited by the owners or managers of the property only on a monthly or, in some cases, only on a yearly basis. The owners or managers of such buildings, however, have an interest in determining, prior to such monthly or yearly visits, whether the condition of the building is unsatisfactory. For example, owners or managers have an interest in determining whether the temperature and other conditions of the building are being maintained at a satisfactory level so that the building and its contents will not be damaged.

Accordingly, several devices have been developed which actively notify the owner or manager of a building upon a condition within the building reaching or surpassing a predetermined set point. For example, devices are known which may be connected to a telephone line wherein the device causes the telephone line to actively call a predetermined telephone number when an alarm condition, such as the presence of smoke or fire, is detected. In addition, devices are known which allow a measurement or control device to be adjusted from a remote location by use of signals generated by a telephone or a modem.

These conventional notification devices suffer from several disadvantages. These devices often require complicated circuitry for operation and, therefore, are susceptible to breakdown or malfunction. In addition, these devices respond actively to a predetermined measurement condition such that the devices must be battery operated or directly wired to a power source. Accordingly, these devices will not function when power to the device is interrupted such as by malfunction of the power source or expiration of the batteries. A malfunctioning or a non-powered device will not actively notify a building owner or manager upon the onset of an alarm condition, thereby giving the owner or manager a false sense of security regarding the condition of the unattended building.

Accordingly, there is a need for a remote detection device that allows an owner or manager of an unattended or unoccupied building to determine the condition of the building from a remote location. Moreover, there is a need for a remote detection device wherein operation of the device is not dependent upon connection to a power source or the operation of batteries.

SUMMARY OF THE INVENTION

Accordingly, an object of the present invention is to provide a remote detection device that allows the remote determination of whether a condition, such as temperature, has reached or surpassed a predetermined threshold level in a detection location.

Another object of the present invention is to provide a remote detection device that does not require complicated circuitry or components.

Still another object of the present invention is to provide a remote detection device wherein the device does not require connection to a power source for operation.

Yet another object of the present invention is to provide a remote detection device that may include an automatic dialing component which periodically monitors the status of a communication line connected to a measurement device at the remote location.

Accordingly, the present invention provides a remote detection device that comprises a conventional measurement device, such as a thermostat, having an internal contact that is wired in series with a resistor and the two wires of a standard telephone line. When the measurement device reaches or surpasses a predetermined set value, such as a predetermined temperature, the measurement device will close the internal contact whereupon the resistor will short the telephone line. The owner or manager of a building, therefore, will receive a busy signal when dialing the telephone line connected to the remote detection device. The device, therefore, allows the building owner or manager to determine the condition of the building at any time. The device is generally not susceptible to breakdown or malfunction due to its simplicity. Moreover the device is not susceptible to shutdown because the device does not require connection to a power source for operation. In another embodiment the remote detection device may comprise an automatic dialing component which periodically monitors the status of a communication line connected to the measurement device at the remote location. In yet another embodiment the measurement device or the automatic dialing component may be housed within a standard telephone housing, within a standard caller identification box housing or the like.

The subject matter of the present invention is particularly pointed out and distinctly claimed in the concluding portion of this specification. However both the organization and method of operation, together with further advantages and objects thereof, may best be understood by reference to the following description taken in connection with accompanying drawings wherein like reference characters refer to like elements.

DETAILED DESCRIPTION

Figure 1:
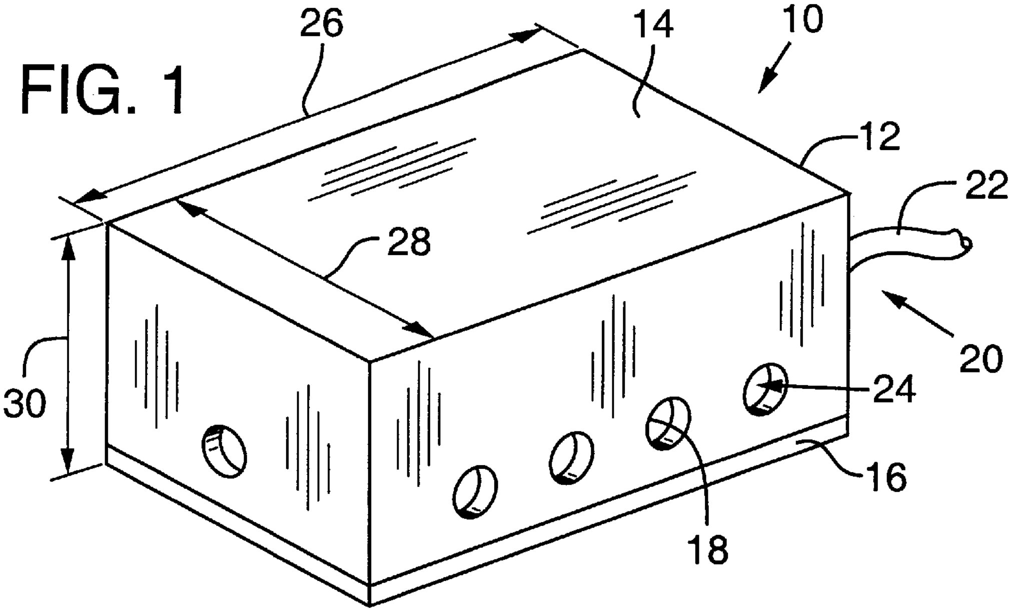
FIG. 1 is a front perspective view of the preferred embodiment of the remote detection device showing the outer housing of the device.

Referring to FIG. 1, which is a front perspective view of the preferred embodiment of the remote detection device showing the outer housing of the device, remote detection device 10, also called a remote indication device, comprises an outer housing 12 including a front cover 14 and a back plate 16. This basic housing may be described as a rectangular box housing. Back plate 16 generally is connected to a mounting bracket (not shown) thereby securing the device to a wall at a position adjacent to a telephone jack (not shown). Front cover 14 includes a plurality of apertures 18, also referred to as air vents, which allow the internal measurement device (shown in FIG. 2) to sense ambient conditions. The front cover also generally includes an aperture 20 which allows a standard telephone line 22 to communicate with an interior 24 of the outer housing. Standard telephone line 22 may comprise any type of communication line or method that is used to communicate with or within remote indication device 10. For example, the communication line may comprise a non-wired system such as a satellite system. Communication line 22 is not used for providing the device with power but merely for the purpose of communicating with the device.

In the preferred embodiment the outer housing has a length 26 of approximately 5 inches (in) (12.5 centimeters (cm)), a width 28 of approximately 3 in (7.5 cm), and a depth 30 of approximately 2.5 in (6.3 cm). This configuration allows a standard wall mount thermostat to be positioned within the outer housing and placed in series with the individual wires of the standard telephone line. The remote detection device may be manufactured in any size as is required to house or communicate with any known measurement device. For example, the outer housing may comprise a caller identification device so that remote detection device 10 and the components of the caller identification system are housed together in a single housing. In another embodiment the outer housing may comprise the outer housing of a standard telephone so that the remote detection device and the components of a standard telephone are housed together in a single housing. In still other embodiments the outer housing may comprise an answering machine or such like device.

Figure 2:
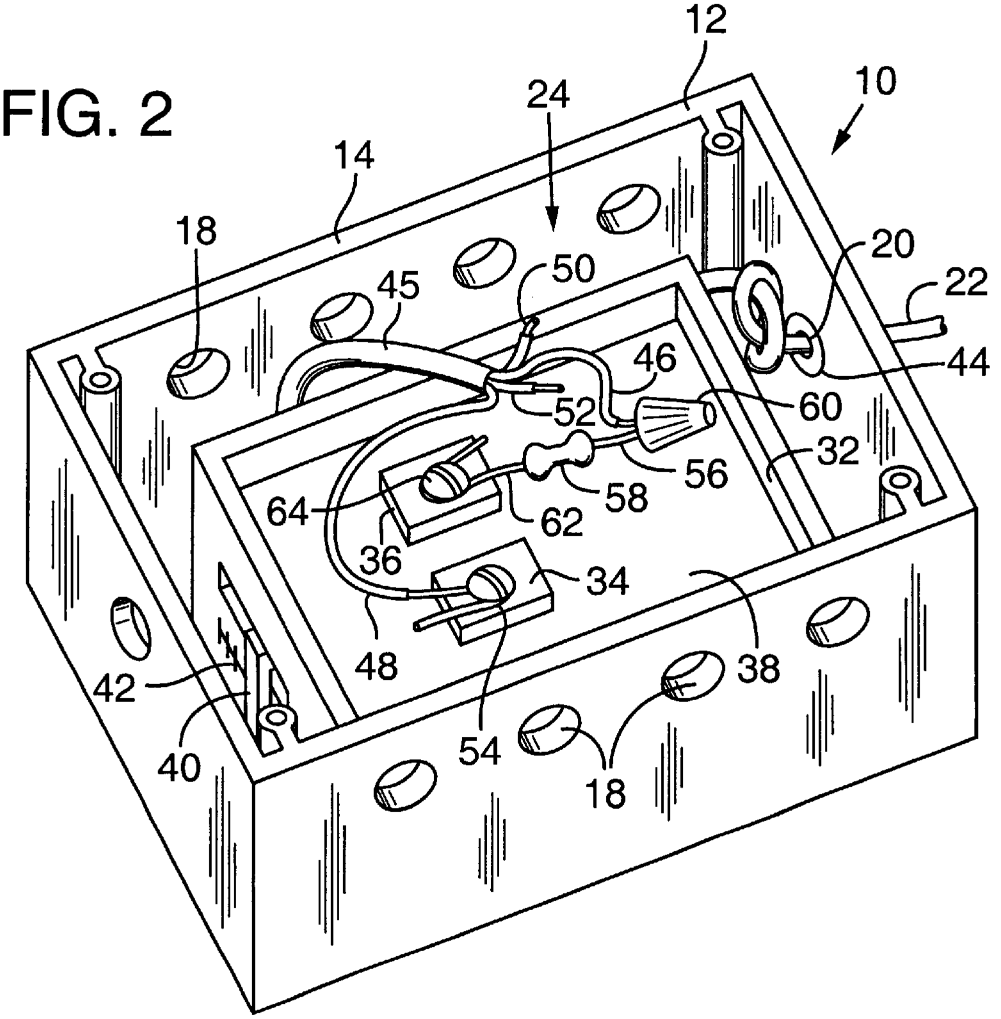
FIG. 2 is a rear perspective view of the preferred embodiment of the remote detection device of FIG. 1 with the back plate of the outer housing removed and showing the internal wiring of the device.

Referring to FIG. 2, which is a rear perspective view of the preferred embodiment of the remote detection device of FIG. 1 with the back plate removed and showing the internal wiring of the device, remote detection device 10 comprises a measurement device 32 housed in interior 24 of outer housing 12. Measurement device 32, in the embodiment shown, comprises a thermostat for measuring the ambient temperature of air surrounding the device. In other embodiments, measurement device 32 may comprise a device that detects smoke, fire, humidity, light, wind, vibration, noise, water level or the like. In each case, measurement device 32 will preferably be housed within the outer housing of remote detection device 10, or other such housing as described above. In other embodiments, detection device 32 may be mounted on a wall or the like wherein outer housing 12 houses the associated wiring, as will be described below, and is positioned adjacent to the measurement device.

Still referring to FIG. 2, thermostat 32 comprises a first contact plate 34 and a second contact plate 36, each in contact with the internal components of thermostat 32. As will be understood by those skilled in the art, thermostat 32 is a conventional thermostat that generally includes a sensing unit comprising an expandable liquid, a bimetallic strip, or a spring bellows, so as to allow the unit to detect an ambient temperature without the need for an associated power source. In other words, the remote detection device is self-powering and does not require power input from an outside source to function. In the preferred embodiment as shown, thermostat 32 includes a bimetallic strip housed internally within a housing 38 of thermostat 32. As will be understood by those skilled in the art, the term sensing unit may also denote an internal contact, a switch, or the like.

Thermostat 32 further includes a control level 40 that typically is positioned adjacent the desired ambient temperature on a temperature scale 42. Accordingly, with control level 40 adjusted to the desired ambient temperature, when the ambient temperature of the detection location surrounding outer housing 12 falls to or below the desired ambient temperature, the internal bimetallic strip within the thermostat will cause an internal contact within the thermostat to close thereby electrically connecting the first and second contact plates in an electrical loop. The bimetallic strip will facilitate automatic reset of the detection device once the ambient temperature rises above the desired ambient temperature. In other words, when the ambient temperature of the detection location surrounding outer housing 12 rises above the desired ambient temperature, the internal bimetallic strip within the thermostat will again cause the internal contact within the thermostat to open thereby electrically disconnecting the first and second contact plates from forming an electrical loop.

In other embodiments, thermostat 32 may comprise a second control lever that typically is positioned adjacent a second desired ambient temperature on temperature scale 42. Accordingly, with the control level adjusted to the second desired ambient temperature, when the ambient temperature of the detection location surrounding outer housing 12 rises above the second desired ambient temperature, a second internal bimetallic strip within the thermostat will cause a second internal contact within the thermostat to close thereby electrically connecting the first and second contact plates in an electrical loop. Accordingly, the first and second internal contacts are positioned in a parallel electrical arrangement so that either contact will facilitate closure of the electrical loop. In such an embodiment, the thermostat allows remote detection of whether the ambient temperature of the detection location surrounding the outer housing is below a predetermined threshold limit and whether the ambient temperature of the detection location surrounding the outer housing is above a second predetermined threshold limit. Similarly, other measurement devices may have multiple threshold limits that can be remotely detected.

Still referring to FIG. 2 standard telephone line 22 is threaded into interior 24 of outer housing through aperture 20. Aperture 20 generally includes a safety bumper 44 made of a flexible material so as to prevent damage to the telephone line. Line 22 generally extends through interior 24 to a position adjacent contact plates 34 and 36. At this position, an outer sheath 45 of telephone line 22 has been removed to expose the four individual wires which together make up standard telephone line 22. The four individual wires typically comprise a red wire 46, a green wire 48, a yellow wire 50 and a black wire 52. Green wire 48 is secured to first contact plate 34 by a fastener 54, typically a threaded screw. Red wire 46 is connected to a first lead wire 56 of a resistor 58 by a wire connector 60. A second lead wire 62 of resistor 58 is connected to second contact plate 36 by a fastener 64, typically a threaded screw. Yellow and black wires 50 and 52 of telephone line 22 remain unconnected and unused in this embodiment. Accordingly, in this configuration, the red and green individual wires, the thermostat and the resistor are connected in series to create an electrical loop. The loop is open or closed depending on the corresponding open or closed position of the internal electrical contact switch of thermostat 32. Those skilled in the art will understand the internal electrical switch is movable between an open and a closed position but that the switch may comprise any device, including a solid state device, with no movable parts.

In the preferred embodiment, resistor 58 is a coiled wire type resistor having a resistance of approximately 1000 ohms. As will be understood by those skilled in the art, resistor 58 may comprise any known resistance device, any known resistance value, or any known communication line shorting device, as is required for the particular application. In particular, resistor 58 generally will be manufactured of a material and in a size which allows the shorting of a standard telephone line when connected thereto. Moreover, as will be understood by those skilled in the art, resistor 58 may comprise any known shorting device that is capable of shorting a communication line or method so as to allow remote detection of the desired condition.

Figure 3:
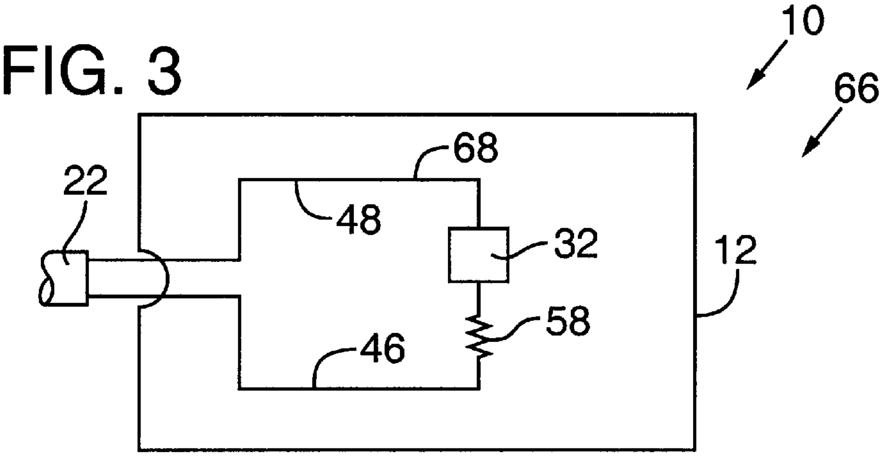
FIG. 3 is a schematic diagram of the preferred embodiment of the remote detection device showing a wiring diagram of the internal wiring of the device.

Referring to FIG. 3, which is a schematic diagram of the preferred embodiment of the remote detection device showing a wiring diagram of the internal wiring of the device, wiring diagram 66 shows outer housing 12 which houses measurement device 32, such as a thermostat, and resistor 58. As stated above, housing 12 may comprise a caller ID box, a standard telephone housing, the housing of a telephone answering machine or any such housing. The thermostat and the resistor are connected in series with the red and green wires 46 and 48, respectively, of standard telephone line 22 to form a circuit 68. In the preferred embodiment, measurement device 32 includes an internal contact (not shown) movable between an open position and a closed position. Movement of the internal contact to the closed position will place circuit 68 in the closed position whereas movement of the internal contact to the open position will place circuit 68 in the open position. In the closed position, red wire 46 and green wire 48 are connected to resistor 58 such that the resistor will short telephone line 22. In other words, when thermostat 32 reaches a predetermined threshold value of the detected condition, the internal bimetallic strip of the thermostat will form a closed circuit such that resistor 58 connects wires 46 and 48. As stated above, the switch may be a solid state device that moves, or switches, between an open and a closed position. When telephone line 22 is shorted, the line will give a busy signal when called via a telephone or automatic dialing device. When the telephone line is not shorted, i.e. when the switch is open, the line will give a ringing signal when called via a telephone or automatic dialing device.

Figure 4:
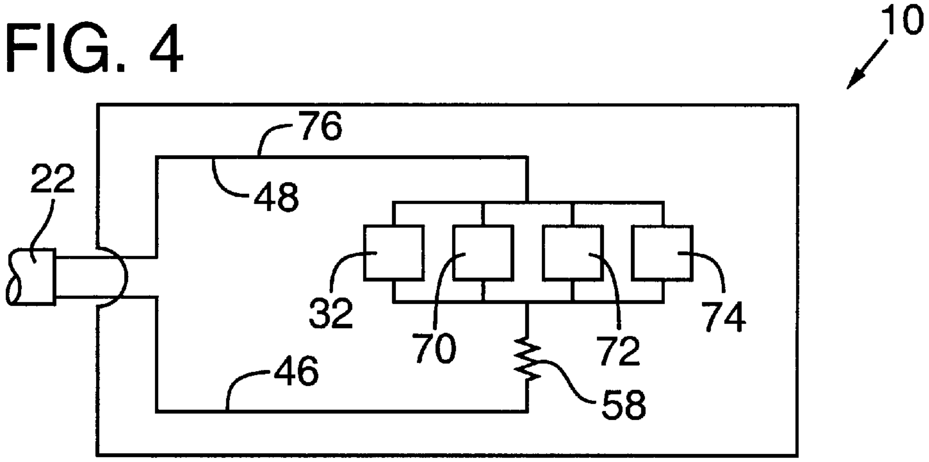
FIG. 4 is a schematic diagram of another preferred embodiment of the remote detection device showing a wiring diagram of the internal wiring of the device having multiple measurement devices positioned within a single remote detection device.

Referring to FIG. 4, which is a schematic diagram of another preferred embodiment of the remote detection device showing a wiring diagram of the internal wiring of the device having multiple measurement devices positioned within a single remote detection device, multiple measurement devices 32, 70. 72 and 74 are shown connected in parallel, wherein the parallel arrangement of the multiple measurement devices is shown connected in series with the remainder of remote detection device 10. The multiple detection devices may comprise a thermostat, a smoke detector, a wind detector, and a humidity detector, for example. Accordingly, if any one or more of the multiple detection devices passes their desired threshold condition value, circuit 76 will be closed thereby shorting telephone line 22. In other words, if any one or more of the measured conditions passes its corresponding desired threshold level, or moves outside its corresponding desired range, circuit 76 will be closed thereby connecting telephone wires 46 and 48.

Installation and operation of remote detection device 10 will now be described. Remote detection device 10 preferably is positioned adjacent to telephone line 22. Front cover 14 of the remote detection device is removed from back plate 16 thereby exposing first and second contacts 34 and 36 of thermostat 32. Telephone line 22 is threaded through aperture 20 of the outer housing such that the telephone line communicates with interior 24 of the housing. The outer sheath of the telephone wire is removed within the housing so that the red, green, yellow and black wires of telephone line 22 are exposed. Red wire 46 of the standard telephone line is connected to resistor 58, which is in turn connected to second contact plate 36. Green wire 48 of the standard telephone line is connected to first contact plate 34.

Control lever 40 is adjusted along temperature scale 42 to a desired threshold temperature. In this example, the desired threshold temperature is chosen as the minimum ambient temperature that the building owner or manager finds acceptable as a building temperature. In other words, the desired threshold temperature may be chosen as the temperature where the building or its contents may begin to become damaged. For example, the desired threshold temperature may be set at 58° F., indicating that the owner or manager of the building desires the ambient temperature of the building to remain above 58° F. at all times. The temperature of the building typically is maintained by a heating) or a cooling device not connected to the remote detection device of the present invention. The threshold value of the detection device may also be set several degrees above the temperature at which the building or its contents may become damaged so as to allow detection of a broken furnace, for example, prior to any damage being incurred to the contents of the building. Once the threshold temperature is chosen by positioning of control lever 40, the control lever may be adjustably secured in place by any known means, such as by standard hook and pile material, pins or the like.

Back plate 16 of remote detection device 10 is then fastened to front cover 14, taking care to ensure that none of the wires are pinched between the front cover and the back plate. A spacer may be positioned between measurement device 32 and the front cover or the back plate to ensure that the measurement device cannot be jolted or otherwise moved within outer housing 12. The device is then mounted on a surface, such as the interior wall of a building, adjacent to the telephone line. Once mounted, the installer must take care to ensure that apertures 18 are not blocked so that measurement device 32 is able to sense ambient conditions within the building. Changing the desired threshold temperature, or changing the threshold limit of any detected condition, once the unit has been mounted is accomplished in much the same manner, as will be understood by those skilled in the art.

In this connected and mounted position the self-powered internal bimetallic strip of thermostat 32 will continuously sense the ambient temperature without the need for connection to a hard wired power source and without the need of batteries or other independent power sources. When the ambient temperature of the detection location surrounding the remote detection device is above the desired threshold temperature, for example, in cold locations, the internal contact of thermostat 32 will remain open. Under these conditions, when a person dials the telephone number associated with telephone line 22, the person will hear an open telephone line signal, i.e., the telephone line will give a normal ringing sound. This will indicate to the person calling that the ambient temperature of the unoccupied or unattended building is above the desired threshold temperature. The person calling can be assured that the open telephone line is not due to a power shortage because remote detection device 10 is passive and does not require connection to a power source for operation. Moreover, due to the simplicity of the remote detection device, the person calling can be relatively sure that the device has not malfunctioned. The remote detection device, therefore, allows the condition of a building to be checked without physically travelling to the building and with the assurance that the positive indication from the remote detection device is not due to a power failure or a malfunctioning measurement device. As will be understood by those skilled in the art, in hot desert or tropical locations the thermostat may by set up to detect the point at which the ambient temperature rises above a desired threshold temperature.

In colder locations, as discussed above, when the ambient temperature of the detection location surrounding the remote detection device falls to or below the desired threshold temperature, the internal contact of thermostat 32 will close, completing the wiring circuit. This will connect the red and green wires of telephone line 22 through resistor 58. Under these conditions, when a person dials the telephone number associated with telephone wire 22, the person will hear a closed telephone line signal, i.e., the telephone line will give a busy signal. This indicates to the person calling that the ambient temperature of the building has fallen to or below the desired threshold temperature. The manager or owner of the building is thereby alerted to a potentially dangerous or financially damaging condition and is able to take immediate action.

In another embodiment, another measurement device or another control lever can be included within the remote detection device such that a person can determine if the ambient temperature of a building is within a desired temperature range. Moreover, measurement device 32 may comprise any known measurement device such as a device that detects smoke, fire, humidity, light, wind, vibration, noise, water level or the like. In still other preferred embodiments, several measurement devices, each measuring a distinct conditions may be wired in parallel with each other, the parallel arrangement being wired in series with the remainder of remote detection device 10, such that a person calling the single telephone line 22 will hear a normal ringing sound it all conditions have not reached or surpassed a desired threshold condition setting, or are within a desired condition range if two control levers are used in the detection of each condition. If a person calling the single telephone line hears a busy signal, the busy signal will indicate that one or more of the conditions measured has moved to or beyond the desired threshold value or range limits. Accordingly, by use of a single telephone line a user can verify whether all conditions at a remote location are within an acceptable range of values.

Figure 5:
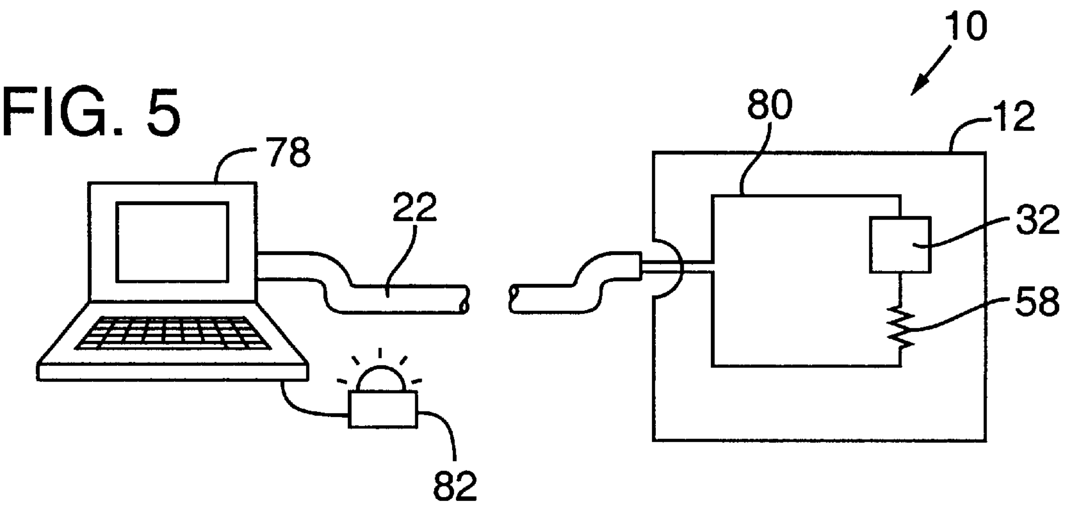
FIG. 5 is a schematic diagram of another preferred embodiment of the remote detection device showing an automatic dialing component connected via a communication line to a measurement device.

Referring to FIG. 5, which is a schematic diagram of another preferred embodiment of the remote detection device showing an automatic dialing component connected via a communication line to a measurement device, remote detection device 10 comprises a computer component 78, also called a dialing device, connected via communication line 22 to a circuit 80. Accordingly, in this embodiment, the entirety of device 10 is not contained within housing 12. Computer component 78 may comprise an entire computer including a computer program dedicated to periodically dialing a telephone number associated with measurement device 32 and shorting device 58. In other embodiments, computer component 78 may comprise a computer subprogram that is periodically activated to dial the telephone number associated with measurement device 32 and shorting device 58. In other embodiments, dialing device 78 may comprise any device that functions to periodically determine the status of communication line 22 associated with measurement device 32 and shorting device 58.

Dialing device 78 preferably includes an alarm signal, or is connected to an alarm device 82, so that upon encountering a busy signal when dialing the telephone number associated with measurement device 32, the alarm signal or device will be activated. Accordingly the proactive, powered component of remote detection device 10, namely the dialing and alarm devices, can be located at a building owner's or a building manager's office and the passive, non-powered component of remote detection device 10, namely the detection and shorting devices, can be positioned at the remote location. In this manner, the condition of a building at the remote location can be actively and periodically monitored without the necessity of a powered measurement device positioned at the remote location and without the constant attention of the building owner or manager. As will be understood by those skilled in the art, the remote detection device may be used at remote locations which do not include buildings, such as agricultural or livestock locations, water reservoirs, river crossings, or the like.

In one preferred embodiment, dialing device 78 may comprise a computer program that accesses a database of telephone numbers wherein the program is activated to call each of the telephone numbers thereby to detect the status of each corresponding communication line. Upon encountering a busy signal from any of the communication lines, a corresponding alarm signal will be generated. In this manner, a single monitoring site may be constructed wherein multiple non-powered, remote locations are monitored. Upon encountering each normal open circuit, i.e., a ringing telephone signal, the dialing device may be constructed to note the time of the communication and the status of the communication line for documentation purposes. Accordingly, the remote detection device of the present invention is constructed to use the open or closed condition of a communication line to assess the condition of a remote location without requiring power at the remote location.

Figure 6:
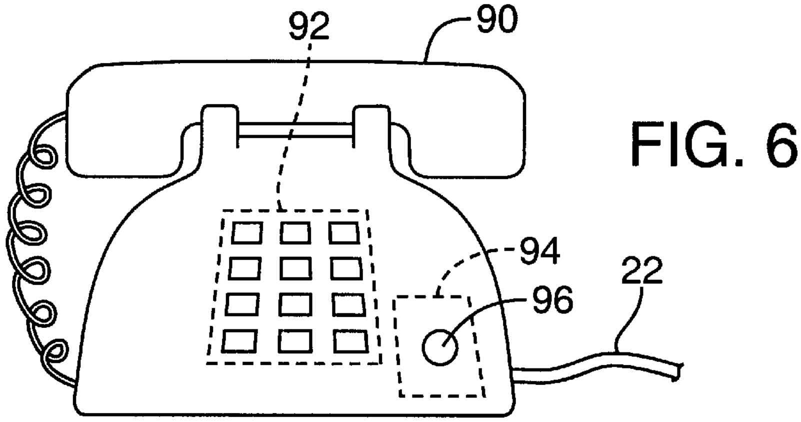
FIG. 6 shows an outer housing comprising a telephone housing positioned at a detection location.

FIG. 6 shows a telephone housing 90 which encloses the components of a standard telephone 92, shown in dash lines, and the components of the remote detection device 94, shown in dash lines, which are wired in series. The detection device is mounted within the telephone housing and senses ambient conditions at the telephone's location through an aperture 96 in the housing body. The detection device and the standard telephone components are connected to communication line 22 within the housing. The detection device, therefore, is incorporated into a telephone housing which may be mounted at the remote measurement site so that the telephone can be used when an operator is at the measurement location. Accordingly if the telephone component is being used or if one or more of the measurement devices associated with the detection device has passed its threshold condition, communication line 22 will indicate a busy signal when the communication line is accessed. i.e., called from another telephone. This embodiment is more expensive to manufacture than a stand-alone detection device but is easier to install in that the user merely plugs communication wire 22 of telephone 90 into a telephone jack at the measurement location to connect the detection device and the telephone components to the telephone wiring system. Similarly the detection device may also be housed in an answering machine housing.

Figure 7:
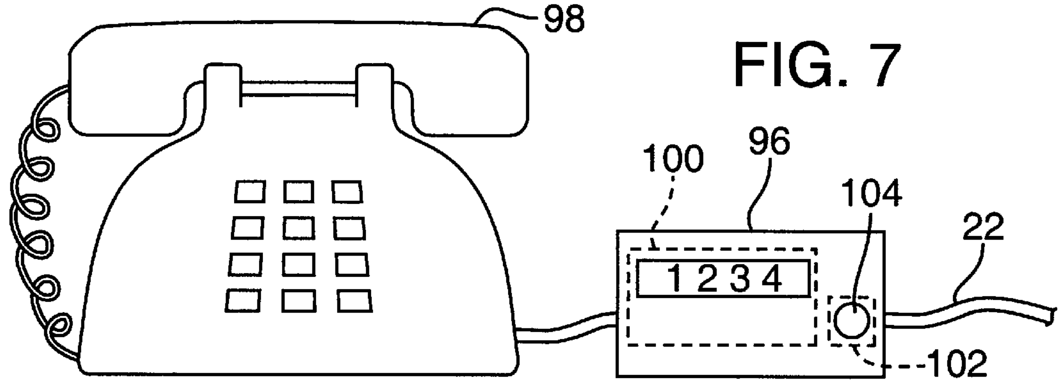
FIG. 7 shows an outer housing comprising a caller identification box housing positioned at a detection location.

FIG. 7 shows a standard telephone 98 and a caller identification box 96 which houses therein a caller identification system 100, shown in dash lines, and a remote detection device 102, shown in dash lines. The detection device is mounted within the caller I.D. housing and senses ambient conditions at the box's location through an aperture 104 in the housing body. The detection device and the standard caller I.D. box components are connected to communication line 22 within the box housing and typically are positioned at the remote detection location. The detection device, therefore, is incorporated into a caller I.D. box housing which may be mounted at the remote measurement site so that the caller I.D. box can be used when an operator is at the measurement location. Accordingly, if the telephone component is being used, or if one or more of the measurement devices associated with the detection device has passed its threshold condition, communication line 22 will indicate a busy signal when the communication line is accessed, i.e., called from another telephone. This embodiment is more expensive to manufacture than a stand-alone detection device but is easier to install in that the user merely plugs a standard telephone into the caller I.D. box and then merely plugs communication wire 22 of caller I.D. box 96 into a telephone jack to connect the measurement device and the caller identification components to the telephone wiring system.

Figure 8:
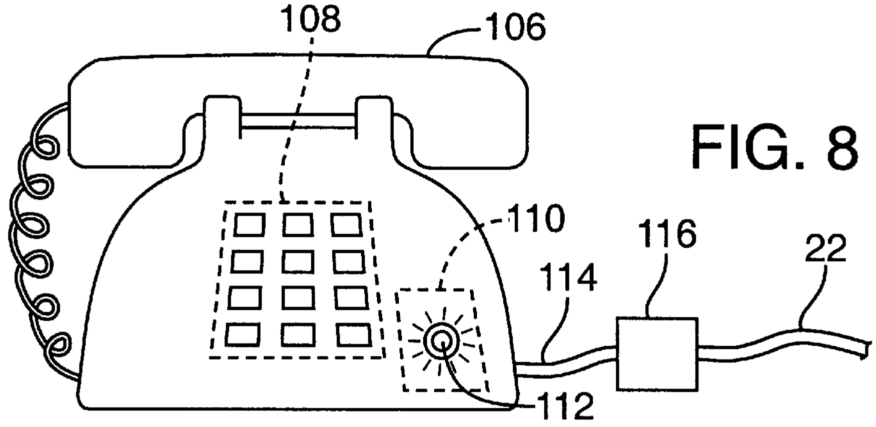
FIG. 8 shows an outer housing comprising a telephone housing positioned at a location remote from a detection location.

FIG. 8 shows a telephone housing 106 including the components of a standard telephone 108, shown in dash lines, and the components of an automatic dialing component 110, shown in dash lines. Automatic dialing component 110 may comprise an alarm device 112, such as a light that flashes when activated. Components 108 and 110 are connected in series within housing 106 to a communication line 114 which is connected to a telephone system 116 which thereby connects components 108 and 110 to a communication line 22 at the remote detection site. Automatic dialing component 110 may be programmed to periodically dial the number associated with communication line 22 at a remote detection site. When a busy signal is encountered by automatic dialing device 110, the device will activate alarm light 112, or other alarm signals such as a siren or a vibrational pager, to alert an operator than an alarm condition exists. Housing 106 typically is not located at a remote detection location but instead is located at a detection center where multiple remote sites may be simultaneously monitored by an individual operator.

Figure 9:
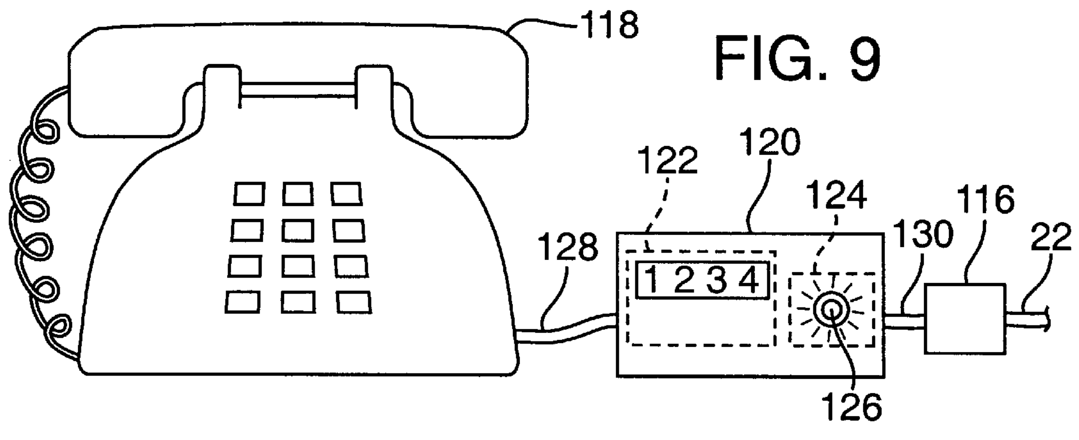
FIG. 9 shows an outer housing comprising a caller identification box housing positioned location remote from a detection location.

FIG. 9 shows a standard telephone housing 118 connected to a caller identification box 120 enclosing therein components 122, shown in dash lines, of a standard caller identification system and components 124 of an automatic dialing system, shown in dash lines. Automatic dialing system 124 typically includes an alarm signal 126, such as a light, a vibrational device or a siren. Telephone 118 is connected to caller identification box 120 by a communication line 128, and caller identification box 120 is connected to telephone system 116, and therefore to communication line 22 at a remote location, by a communication line 130. Automatic dialing component 124 may be programmed to periodically dial the number associated with communication line 22 at a remote detection site. When a busy signal is encountered by automatic dialing device 124, the device will activate alarm signal 126 to alert an operator than an alarm condition exists. Housing 120 typically is not located at a remote detection location but instead is located at a detection center where multiple remote sites may be simultaneously monitored by an individual operator. Incorporation of the automatic dialing device in a caller identification box allows non-commercial residential users to add to their phone the automatic dialing features of a remote detection device without purchasing a new telephone. Accordingly, device 120 may be used by individuals having a vacation home that wish to monitor their vacation home from their primary residence.

While preferred embodiments of the present invention have been shown and described, it will be apparent to those skilled in the art that many changes and modifications may be made without departing from the invention in its broader aspects. The appended claims are intended to cover, therefore, all such changes and modifications as fall within the true spirit and scope of the invention.

I claim:

1. A remote detection device comprising:

a measurement device including a switch movable between an open and a closed position, and a shorting device operable to short a communication line, wherein the measurement device is adapted to be connected to a first wire of the communication line, wherein the shorting device is adapted to be connected to a second wire of the communication line, and wherein the measurement device is connected to the shorting device to define an electrical circuit, wherein said measurement device and said shorting device operate without power applied thereto.

2. The remote detection device according to claim 1 wherein said shorting device and said measurement device are positioned within an outer housing chosen from the group consisting of a rectangular housing, a telephone housing, an answering machine housing and a caller identification box housing.

3. The remote detection device according to claim 1 further comprising a second measurement device including a switch movable between an open and a closed position, wherein said second measurement device is connected in parallel to said measurement device.

4. The remote detection device according to claim 1 wherein said shorting device is a resistor.

5. The remote detection device according to claim 4 wherein the resistor is a coiled wire resistor having a resistance of approximately a 1,000 ohms.

6. The remote detection device according to claim 1 wherein said measurement device is chosen from the group consisting of a temperature measurement device, a smoke measurement device, a fire measurement device, a humidity measurement device, a light measurement device, a wind measurement device, a vibration measurement device, a noise measurement device, and a water level measurement device.

7. The remote detection device according to claim 1 wherein said remote detection device is self-powered.

8. The remote detection device according to claim 1 wherein the measurement device is adjustable to define a desired threshold value of a condition to be measured.

9. The remote detection device according to claim 1 further comprising an automatic dialing device positioned remote from said measurement device and said shorting device.

10. The remote detection device according to claim 1 further comprising a communication line including a first wire and a second wire, wherein said first wire of the communication line is connected to a first contact of said measurement device, wherein said second wire of the communication line is connected to a first wire of said shorting device, and wherein a second wire of said shorting device is connected to a second contact of said measurement device to define said electrical circuit.

11. A remote indication system comprising:

a sensing device including a switch movable between a non-contact position and a contact position;

a shorting device operable to short a communication line wherein a first wire of the communication line is connected to said sensing device, a second wire of the communication line is connected to said shorting device, and wherein the sensing device is connected to the shorting device to define an electrical circuit; and an automatic dialing device positioned remote from said sensing device and said shorting device and connected to said electrical circuit via said communication line, wherein said electrical circuit operates to short said communication line without power input thereto.

12. The remote indication system according to claim 11 wherein said automatic dialing device is positioned within an outer housing chosen from the group consisting of a rectangular housing, a telephone housing, an answering machine housing and a caller identification box housing.

13. The remote indication system according to claim 11 further comprising a second sensing device including a switch movable between a non-contact position and a contact position, wherein said second sensing device is connected in parallel to said sensing device.

14. The remote indication system according to claim 11 wherein said sensing device is chosen from the group consisting of a temperature sensing device, a smoke sensing device, a fire sensing device, a humidity sensing device, a light sensing device, a wind sensing device, a vibration sensing device, a noise sensing device, and a water level sensing device.

15. A remote indication device comprising:

a sensing device including a switch movable between a non-contact position and a contact position, a shorting device operable to short a communication line, wherein a first wire of the communication line is connected to the sensing device, wherein a second wire of the communication line is connected to the shorting device, and wherein the shorting device is connected to the sensing device to define an electrical circuit, and a determination device positioned remote from said sensing device and said shorting device, said determination device operable to dial a telephone number associated with said communication line so as to determine the position of the switch from a remote location, wherein said communication line will deliver a busy signal to said determination device when said switch in is in the closed position and said communication line will deliver a ringing signal to said determination device when said switch is in the open position, while said sensing device and said shorting device are un-powered.

16. The remote indication device of claim 15 wherein the determination device comprises a computer.

17. The remote indication device of claim 15 wherein the determination device comprises an automatic dialing device.

18. The remote indication device of claim 15 further comprising an alarm device operatively connected to the determination device, and wherein said alarm device is chosen from the group consisting of a visual alarm, an audible alarm, and a vibrational alarm.

* * * * *